United States Patent Office 3,623,267
Patented Nov. 30, 1971

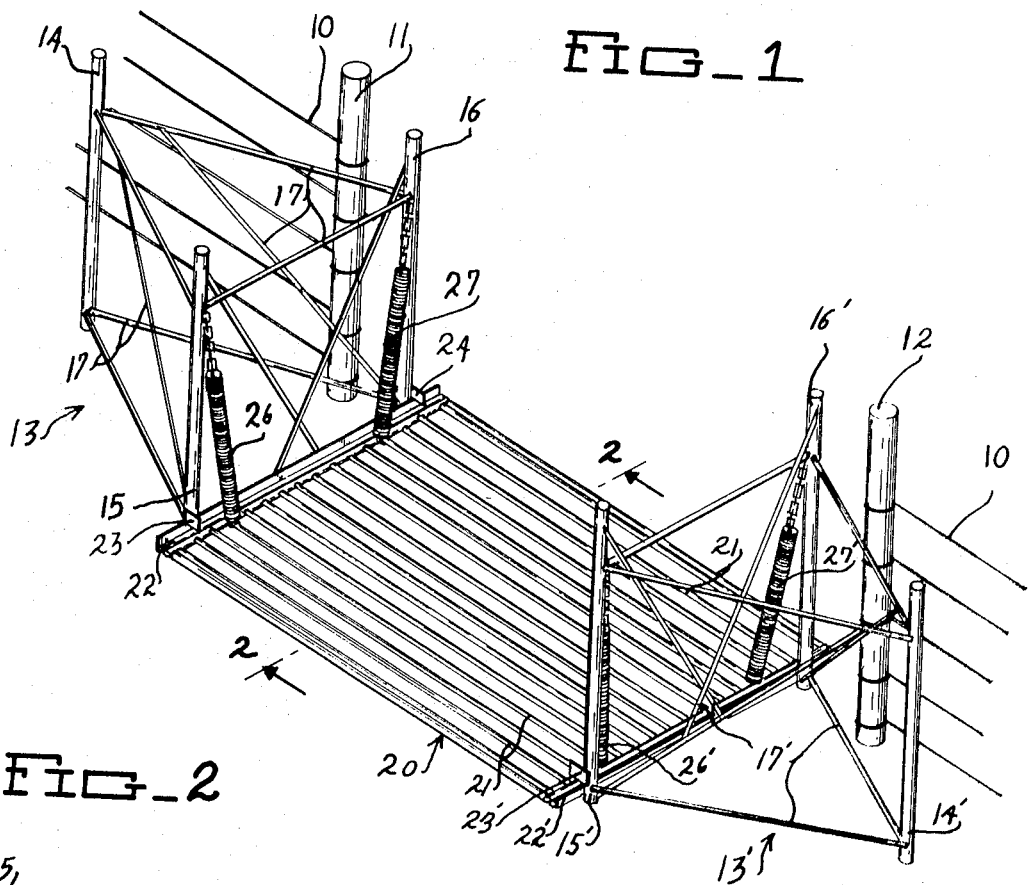
Fig_1
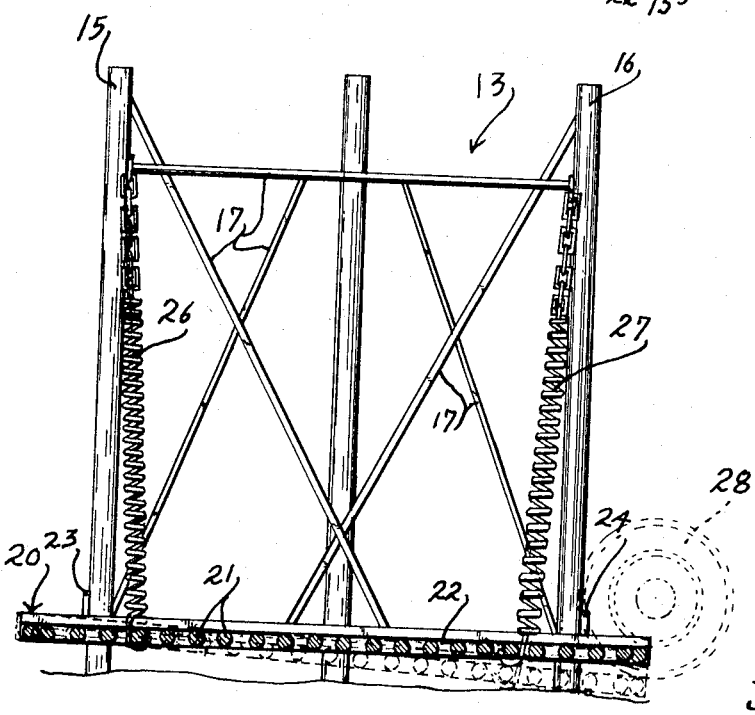
Fig_2
INVENTOR.
JOE WILLIAMS
BY
Merchant & Gould
ATTORNEYS

3,623,267
CATTLE GUARD
Joe Williams, P.O. Box 264, Gettysburg, S. Dak. 57442
Filed Jan. 7, 1970, Ser. No. 1,128
Int. Cl. E06b *11/00*
U.S. Cl. 49—131   3 Claims

ABSTRACT OF THE DISCLOSURE

A cattle guard mounted on the existing ground surface in an opening in a fence line is disclosed. Three post-like members connected together by cross braces are positioned on each side of the opening and a rectangular gridiron-like structure is positioned between them. A pair of post-like members are positioned closely adjacent each end of the gridiron-like structure and each is provided with a stop member securely fastened thereto a predetermined distance above the ground surface. A plurality of coil springs have their upper ends connected to the post-like members and their lower ends connected to the gridiron-like structure to yieldingly force it upwardly against the stop members.

BACKGROUND OF THE INVENTION

Field of the invention

This invention relates generally to cattle guard structures and more particularly relates to one in which a flat gridiron-like structure is yieldingly supported a predetermined distance above the existing ground surface to normally deter cattle from passing thereover and to permit a wheeled vehicle to force it downwardly into contact with the ground surface for passage thereover.

Description of the prior art

The most typical prior art cattle guard structure employs a plurality of spaced beams extending transversely of an opening in a fence line with a suitable open space being provided beneath the beams. If the openings between the beams are sufficiently deep, hoofed animals will be afraid to cross the structure, but wheeled vehicles can easily pass over it. In a permanent installation of this kind, however, it is usually necessary to dig a pit in the roadway or to provide a suitable framework above the surface of the ground to support the cross beams. A heavy framework and heavy cross beams are required because the structure must be capable of supporting the full weight of a vehicle passing over it. Such a structure is expensive and time consuming to construct and cannot be moved from one location to another.

Other cattle guards or gates have been devised having a pair of hinged sections so that the center portion of the unit can be raised upwardly under normal conditions to deter the passage of animals therethrough. A vehicle approaching from either direction can force the inverted V-shaped gate downwardly into a flat condition so that the vehicle can pass over the gate. Both springs and weights have been used to hold the gate in the closed-to-animals position. Many of these structures have also required permanent installations and have been rather complicated and cumbersome to install and operate.

The prior art permanent installations in which the cross braces support the entire vehicle weight have become too expensive and time consuming to construct except in permanent, heavily used roadways. A number of attempts have been made to simplify the structure to reduce both initial cost and cost of installation. However, the improved prior art structure of which I am aware are still rather complicated and most of them cannot be easily moved from one location to another. Further, the non-permanent prior art structures of which I am aware require that a vehicle come almost to a stop before attempting to pass over the grid. The grid structure has not been designed to move quickly out of the way to permit passage of a vehicle over it at relatively high speed. The movable or collapsible prior art cattle guard structures that I am aware of would be severely damaged if a vehicle attempted to pass over them at a high rate of speed.

SUMMARY OF THE INVENTION

The present invention provides a cattle guard with many unique features. The rigid support means that are positioned on each side of the fence opening can be fabricated at a central location, transported to the fence opening, and placed on the existing ground surface. Preferably, shallow openings are dug into the ground surface to accommodate the post-like members forming the support means, to prevent shifting thereof, but deep holes need not be dug as for a regular fence post.

The rectangular, gridiron-like structure is positioned between the support means, beneath suitable stop members fastened to the post-like members. A plurality of coil springs are provided to hold the gridiron-like structure upwardly against the stop members under normal conditions.

As will be evident from the present disclosure, this cattle guard can be quickly assembled in a fence opening, and quickly disassembled for removal to another location if desired. The gridiron-like structure should be strong enough to support itself between the support means, but it does not have to be strong enough to support a vehicle because it is forced downwardly into conact with the ground upon passage of a wheeled vehicle thereover. Another advantage of the present invention is that a wheeled vehicle can move over the gridiron-like structure at a relatively high speed without causing damage to either the cattle guard or the vehicle. I have driven over the present cattle guard in an automobile at over fifty miles per hour without incident.

The cattle guard of the present invention is also unusually effective in deterring cattle from passing over it, because it tends to oscillate on the supporting springs if an animal touches it. This oscillation of the gridiron-like structure frightens an animal attempting to cross it more than the ordinary rigid cattle guard structure will do.

BRIEF DESCRIPTION OF THE DRAWINGS

FIG. 1 is a view in perspective of a cattle guard assembly according to the present invention, mounted in an opening in a fence line; and FIG. 2 is a sectional view taken along line 2—2 of FIG. 1, showing an alternate position of the gridiron-like structure in phantom.

DESCRIPTION OF THE PREFERRED EMBODIMENT

Referring now to the drawings, wherein like reference numerals will be used throughout to identify like elements of the invention, there is disclosed in FIG. 1 a fence line 10 including a pair of permanently positioned posts 11 and 12 defining an opening between them. The fence line opening would be situated across a roadway or in some location where periodic travel by a wheeled vehicle is desired. Also shown in FIG. 1 is my improved cattle guard assembly for mounting with respect to the existing ground surface in the opening in fence line 10. The cattle guard assembly includes a first support means 13 and a second support means 13' positioned on opposite sides of the fence opening. Because the two support means 13 and 13' are identical in construction, only one will be described in detail, but the other will bear the same reference numerals accompanied by a "prime" notation.

First support means 13 includes three vertically extending, spaced, post-like members 14, 15 and 16 securely fastened together in a triangular relationship with a plurality of cross braces 17 so that the support means 13 is self-supporting on the ground surface. Preferably, the post-like members 14, 15 and 16 are tubular steel members and the cross braces 17 are also steel members welded thereto. The support means 13 and 13' can thus be assembled at a factory or other remote location and transported as fully assembled units to the fence line opening. In the embodiment shown, post-like members 16 and 16' would be wired or otherwise secured to posts 11 and 12 to prevent shifting of support means 13 and 13'. If desired, the bottom ends of the post-like members could be dug a short distance into the ground to prevent shifting movements thereof. Alternatively, small stakes could be driven into the ground adjacent the support means 13 and 13' to insure that no relative movements between the two support means would occur. As shown in FIG. 1, the two post-like members 15 and 16 are positioned adjacent one side of the roadway parallel to the line of traffic and the corresponding post-like members 15' and 16' are in like manner positioned on the opposite side of the roadway.

Positioned between the two support means 13 and 13' is a gridiron-like structure 20 that is rectangular in shape with the longer dimension thereof extending transversely of the opening in the fence line. Gridiron-like structure 20 comprises a plurality of spaced, parallel, rod-like members 21 extending transversely of the fence opening and connected on each end thereof by a suitable frame 22, 22'. In the preferred embodiment of my invention, rod-like members 21 are solid-steel rods one inch in diameter, welded at their opposite ends to steel angle irons forming frames 22–22'. Gridiron-like structure 20 is thus a relatively rigid, planar structure which in the preferred embodiment, is approximately eleven feet long and eight feet deep. The rod-like members 21 are positioned approximately six inches apart.

A plurality of steel plates 23, 24, 23' and 24' are welded to post-like members 15, 16, 15' and 16' respectively a predetermined, equal distance above the ground surface. The steel plates form stop means that extend toward the center of the roadway from the respective post-like members. Because the four post-like members 15, 16, 15' and 16' are positioned closely adjacent the frames 22–22', the steel plates extend over the frames 22–22' to limit the upward movement of gridiron-like structure 20.

Means are also provided for yieldingly forcing the gridiron-like structure 20 upwardly against the stop means 23, 24, 23' and 24' to deter cattle from passing between the support means 13 and 13' under normal conditions and to allow the gridiron-like structure 20 to be forced downwardly into contact with the ground surface by a wheeled vehicle for passage thereover. In the preferred embodiment shown on the drawings, these means include a pair of coil springs 26 and 27 associated with support means 13 and another pair of coil springs 26' and 27' associated with support means 13'. The upper ends of the coil springs 26 and 27 are secured to the support means 13 adjacent the upper ends of post-like members 15 and 16 respectively. The bottom ends of coil springs 26 and 27 are secured to gridiron-like structure 20, with the coil springs being under sufficient tension to hold the gridiron-like structure 20 upwardly against stop means 23 and 24. The coil springs associated with support means 13' are mounted in the same manner. Under normal conditions, the coil springs thus hold gridiron-like structure 20 upwardly against the stop means a predetermined distance above the ground surface to deter animals from passing over it. Because of the spring suspension, the grid-iron-like structure 20 will oscillate if an animal touches it to aid in frightening the animal away.

In FIG. 2, a vehicle wheel 28 is shown in phantom, just after it passes over the leading edge of the gridiron-like structure 20. As further shown in phantom, the leading edge of the gridiron-like structure 20 will move downwardly into contact with the ground to permit passage of the vehicle over it. As the vehicle progresses over it, the entire structure 20 will be force downwardly into contact with the ground, and then return to its normal position after the vehicle passes over it. As previously indicated, I have driven an automobile over this type of structure at over fifty miles per hour without causing any damage to either the cattle guard assembly or the automobile.

As shown on the drawings, the lower ends of each pair of coil springs 26, 27 and 26' and 27' are closer together than the upper ends thereof to aid in centering the gridiron-like structure 20 with respect to the support means 13 and 13'. For example, each of the coil springs 26 and 27 will tend to pull gridiron-like structure 20 in an opposite direction so that it automatically centers itself with respect to post-like members 15 and 16.

I have found that the best results are achieved with the present invention if the gridiron-like structure 20 is mounted from between three inches to seven inches above the ground surface. However, as with the other dimensions I have given, the distance of the gridiron-like structure above the ground may be changed a reasonable amount without departing from the invention.

The present invention thus provides an easily portable, low-cost cattle guard assembly that can be easily installed in any fence line opening over any type of ground surface that a wheeled vehicle can use. Because the gridiron-like structure 20 will oscillate when touched by an animal, it is especially effective to deter cattle from passing over it, but yet the structure will permit a vehicle to pass over it at relatively high speed.

What is claimed is:

1. A portable cattle guard for mounting with respect to the existing ground surface in an opening in a fence line, comprising:
   (a) first and second support means positioned on opposite sides of the opening;
   (b) said first and second support means being portable and each comprising at least three vertically extending, spaced, post-like members securely fastened together with a plurality of cross braces so that each support means is self-supporting on the ground surface;
   (c) stop means mounted on a pair of said post-like members of each of said support means a predetermined distance above the ground surface;
   (d) a flat, rigid gridiron-like structure positioned between said first and second support means and beneath said stop means, said pairs of post-like members being positioned adjacent the ends of said gridiron-like structure; and
   (e) means for yieldingly forcing said gridiron-like structure upwardly against said stop means to deter cattle from passing between said support means under normal conditions, and to allow said gridiron-like structure to be forced downwardly into contact with the ground surface by a wheeled vehicle for passage thereover.

2. The apparatus of claim 1 wherein said gridiron-like structure is rectangular in shape with the longer dimension thereof extending transversely of the opening in the fence line and comprises a plurality of spaced, parallel, rod-like members extending transversely of the opening and connected on each end thereof by a suitable frame.

3. The apparatus of claim 1 wherein said post-like members are tubular steel members and wherein said stop means are steel plates, one of said steel plates being welded to each of the post-like members positioned adjacent said frame.

References Cited

UNITED STATES PATENTS

| 2,024,063 | 12/1935 | Roper | 49—131 |
| 2,744,728 | 5/1956 | Melchert et al. | 49—131 X |
| 3,256,637 | 6/1966 | Torrey | 49—131 X |
| 3,296,741 | 1/1967 | Lubmann | 49—131 |
| 3,491,480 | 1/1970 | Nickel, et al. | 49—131 |
| 3,491,482 | 1/1970 | Wedekind | 49—131 |

FOREIGN PATENTS

| 29,773 | 10/1930 | Australia | 49—131 |

DENNIS L. TAYLOR, Primary Examiner

U.S. Cl. X.R.

49—132